United States Patent
Stuttaford et al.

(10) Patent No.: US 7,624,564 B2
(45) Date of Patent: Dec. 1, 2009

(54) APPARATUS AND METHOD FOR PROVIDING AN OFF-GAS TO A COMBUSTION SYSTEM

(75) Inventors: Peter Stuttaford, Jupiter, FL (US); Jon Glende, Stuart, FL (US); Peter So, San Francisco, CA (US); Lee Rosen, Buffalo, NY (US); Khalid Oumejjoud, Palms Beach Gardens, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 915 days.

(21) Appl. No.: 10/897,785

(22) Filed: Jul. 23, 2004

(65) Prior Publication Data

US 2006/0016198 A1 Jan. 26, 2006

(51) Int. Cl.
*F02C 3/22* (2006.01)
(52) U.S. Cl. .............................. 60/39.281; 60/39.465
(58) Field of Classification Search .................. 60/772, 60/39.465, 734, 39.281, 39.463
See application file for complete search history.

(56) References Cited

U.S. PATENT DOCUMENTS

| | | | |
|---|---|---|---|
| 4,362,013 A * | 12/1982 | Kuribayashi | 60/772 |
| 5,112,527 A | 5/1992 | Kobylinski | |
| 5,230,470 A * | 7/1993 | Rajan et al. | 239/8 |
| 5,339,636 A * | 8/1994 | Donnelly et al. | 60/734 |
| RE35,061 E | 10/1995 | Correa | |
| 5,521,264 A * | 5/1996 | Mehra et al. | 526/68 |
| 6,343,462 B1 | 2/2002 | Drnevich et al. | |
| 6,666,027 B1 * | 12/2003 | Cardenas, Jr. | 60/772 |
| 2001/0000282 A1 | 4/2001 | Poleshuk et al. | |
| 2003/0033809 A1 * | 2/2003 | Konezciny et al. | 60/772 |

OTHER PUBLICATIONS

Morris, J.D., Symonds, R.A., Ballard, F.L. and Banti, A., ASME Paper 98-GT-359, 1998., USA.

* cited by examiner

*Primary Examiner*—Michael Cuff
*Assistant Examiner*—Vikansha S Dwivedi

(57) ABSTRACT

A fuel supply system and method thereof that utilizes an off-gas in addition to the primary fuel to lower the emissions of a gas turbine combustion system is disclosed. The fuel supply system apparatus comprises a fuel gas supply conduit and an off-gas supply conduit in fluid communication with the fuel gas supply conduit such that the flow of an off-gas to the fuel gas supply conduit can be regulated as required by the operator to the desired fuel nozzle(s). The fuel gas supply preferably operates with natural gas and the off-gas supply preferably comprises the constituents hydrogen and methane.

14 Claims, 5 Drawing Sheets

Figure 1 – Prior Art

APPARATUS AND METHOD FOR PROVIDING AN OFF-GAS TO A COMBUSTION SYSTEM

TECHNICAL FIELD

The present invention relates to a gas turbine combustion system and more specifically to an apparatus and method of providing an off-gas fuel to a combustion system.

BACKGROUND OF THE INVENTION

A gas turbine engine is a common source of mechanical output either for propulsion requirements or to provide mechanical energy to drive a generator for generating electricity. A typical gas turbine engine comprises at least a compressor, combustion system, and turbine. If the gas turbine is designed for use in generating electricity, a generator is coupled to the shaft of the gas turbine to convert the mechanical energy into electrical generation. Combustion systems provide a region for mixing compressed air and fuel and containing the reaction that occurs when this mixture is introduced to an ignition source. The hot combustion gases are then directed into the turbine, which is coupled to at least the compressor, and optionally a generator.

A fuel supply system feeding a typical combustion system is shown in FIG. 1. A fuel gas supply conduit 10 comprises a main gas pressure regulator 11, which controls the pressure of the fuel supply to the desired level, and a gas control valve 12, which controls the amount of fuel flowing into the supply system. If the combustion system utilizes different stages of fuel nozzles that are to be supplied from the same fuel conduit, then a splitter valve 13 is employed to split the fuel between the downstream circuits as desired by the operator. In the prior art shown in FIG. 1, a primary circuit 14 and secondary circuit 15 are in fluid communication with fuel gas supply conduit 10 by way of splitter valve 13. Additional splitter valves and control valves may be required depending on how the fuel is to be split and controlled as it passes towards the fuel nozzles in the combustion system.

A common issue for both propulsion gas turbine operators and electrical power plant operators is exhaust emissions exiting the engine. Specifically, emission levels of concern are oxides of nitrogen (NOx) and carbon monoxide (CO). Recently, government regulatory agencies have introduced more stringent rules regarding the amount of emissions that can be produced by electrical power plants, thereby requiring power plant operators to upgrade their gas turbine engines to comply with the new regulations, face fines for exceeding pollutant levels, or restrict the amount of time an engine can operate in order to stay within the emissions regulations. As a result of these emissions regulations, gas turbine manufacturers have spent significant time and resources developing new combustion systems to lower polluting emissions. However, these combustion system designs have primarily focused on changes within the existing gas turbine structure in order to improve fuel/air concentrations and mixing or reducing combustion flame temperature in order to lower emissions.

Further reductions to gas turbine emissions are possible when modifications are made with specific regard to the type of fuel used and how it is mixed prior to injection in the combustion chamber. Such changes to fuel type can allow a present combustion system to emit lower levels of emissions without requiring major hardware changes to the combustion system.

SUMMARY AND OBJECTS OF THE INVENTION

A fuel supply system and method thereof that utilizes an off-gas in addition to the primary fuel to lower the emissions of a gas turbine combustion system is disclosed. The combustion system of the present invention preferably operates on a gas fuel such as natural gas. The fuel supply system apparatus comprises a fuel gas supply conduit and an off-gas supply conduit in fluid communication with the fuel gas supply conduit such that the flow of an off-gas to the fuel gas can be regulated as required by the operator. The fuel gas supply conduit further comprises a main gas pressure regulator, at least one fuel gas control valve, at least one fuel gas splitter valve, and contains a fuel gas such as natural gas. The off-gas supply conduit further comprises a means for compressing an off-gas, an off-gas main stop valve, an off-gas control valve, a first mixed fuel stop valve, and contains an off-gas selected from a group of off-gas fuels preferably comprising the common constituents hydrogen and methane.

The fuel supply system of the present invention is preferably configured to direct fuel to a gas turbine combustion system comprising a plurality of fuel nozzles, including a pilot fuel nozzle. The pilot fuel nozzle may also include a plurality of fuel circuits if necessary. The fuel supply system of the present invention includes multiple embodiments depending on where the off-gas is connected to the main fuel gas supply to form a fuel gas/off-gas blended mixture. In the preferred embodiment, the off-gas supply conduit is connected to fuel gas supply conduit such that only the pilot fuel nozzle receives the blended mixture of fuel gas and off-gas, while in an alternate embodiment, the off-gas supply conduit is connected to the main fuel gas supply conduit such that all fuel nozzles in the combustion system receive the blended mixture of fuel gas and off-gas.

It is an object of the present invention to provide a fuel supply system to a gas turbine engine that improves stability and flameout margin thereby allowing a combustion system to operate at reduced emissions levels.

It is another object of the present invention to provide a method of providing an off-gas fuel to a combustion system.

In accordance with these and other objects, which will become apparent hereinafter, the instant invention will now be described with particular reference to the accompanying drawings.

DETAILED DESCRIPTION OF THE PREFERRED EMBODIMENT

The selection of the combustor region in which to use a blended mixture of off-gas with a fuel gas for the reduction of emissions depends on the required emissions levels and individual combustor operation. Historically, pilot fuel nozzles are a source of high emissions due to their flame stability function for the combustor. Therefore, it is desirable for a combustion system that operates on a blended fuel mixture to utilize this blended mixture on at least the pilot fuel nozzle.

Figure 1:
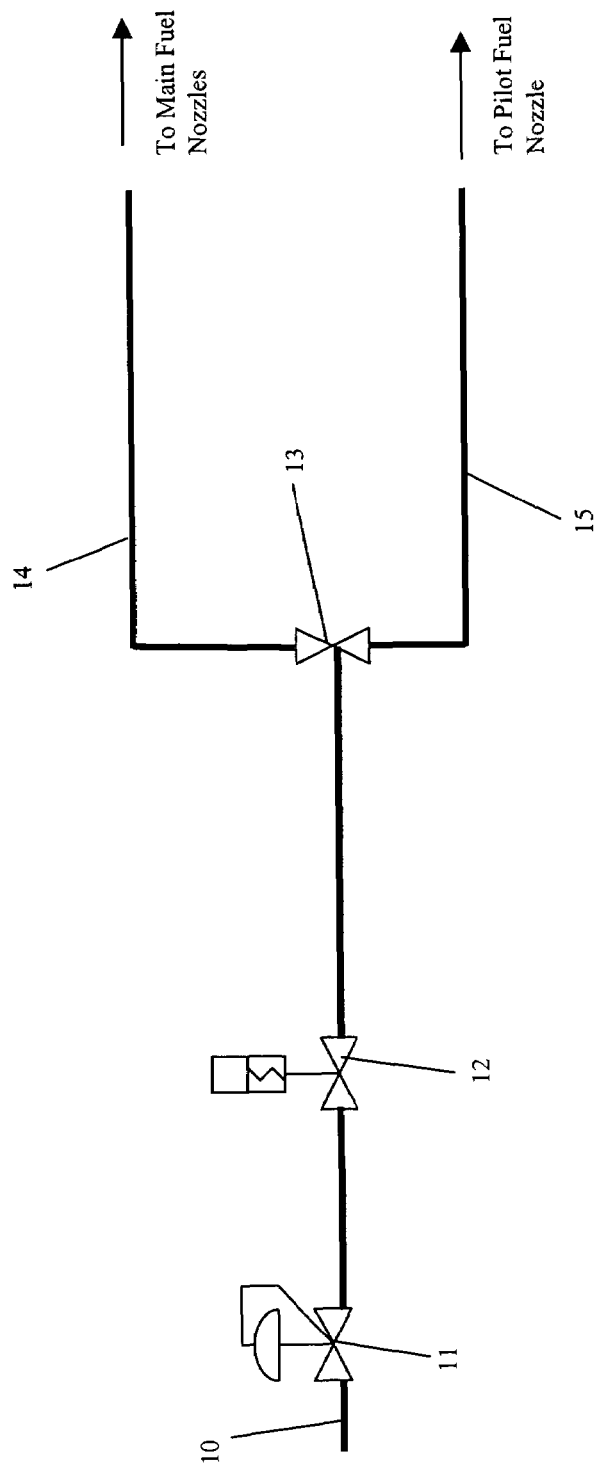
FIG. 1 is a process flow diagram of a prior art fuel system for a gas turbine combustion system.
Figure 2:
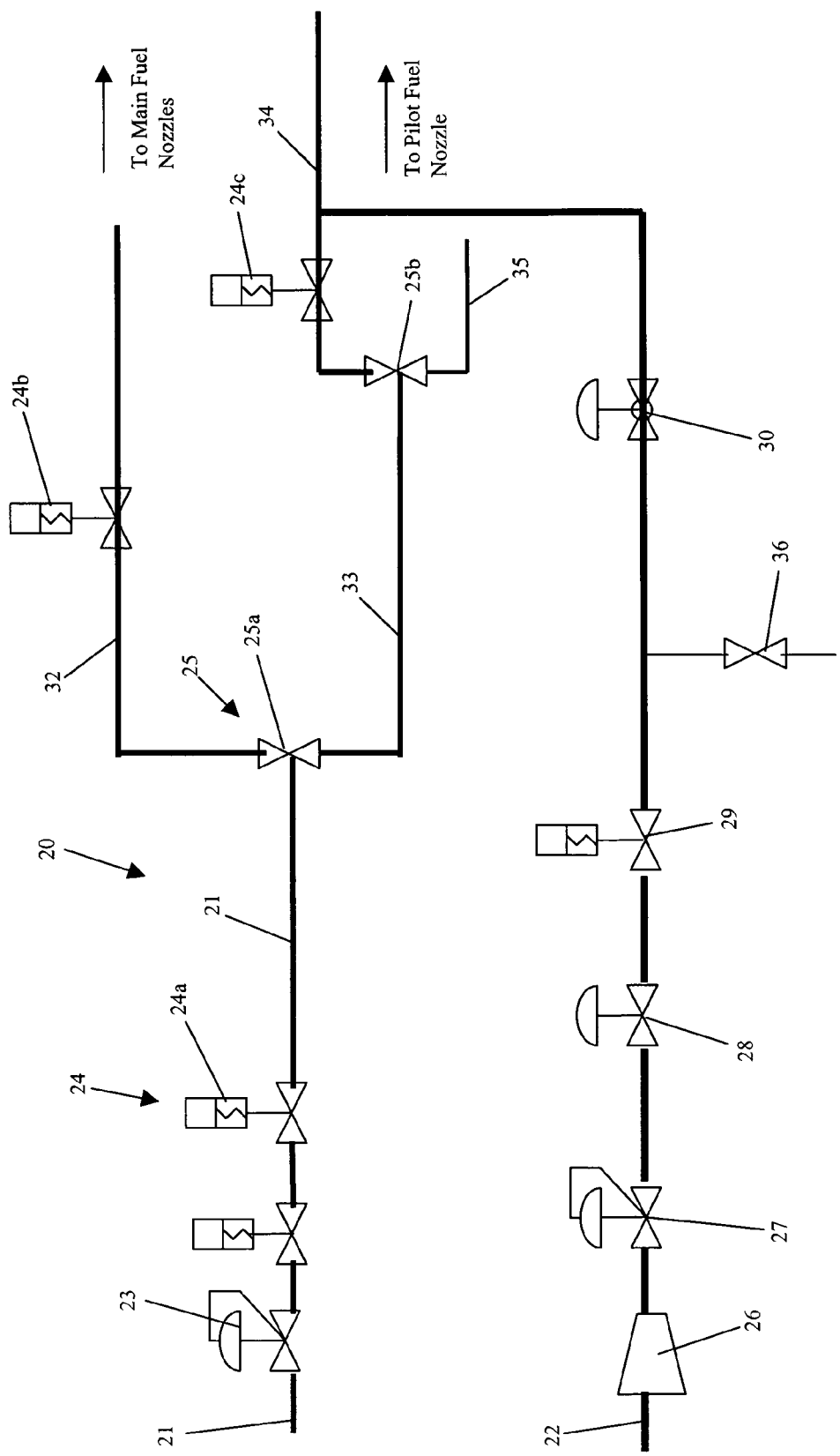
FIG. 2 is a process flow diagram for a fuel supply system in accordance with the preferred embodiment of the present invention.

The preferred embodiment of the present invention, a fuel supply system for introducing an off-gas to a combustion system pilot fuel nozzle, is shown in FIG. 2. The off-gas is directed towards a pilot fuel nozzle, which due to its flame stability characteristics is a well-known source of higher emissions. Fuel supply system 20 comprises a fuel gas supply conduit 21 and an off-gas supply conduit 22. Fuel gas supply conduit 21, which contains a fuel gas such as natural gas, further comprises a main gas pressure regulator 23, at least one fuel gas control valve 24, and at least one fuel gas splitter valve 25. Similar to that described in the prior art, main gas pressure regulator 23 serves to regulate the pressure of the fuel gas in gas supply conduit 21, such that if the fuel gas in gas supply conduit 21 is supplied at too high of a pressure, the fuel pressure can be regulated to a more desirable pressure. Furthermore, fuel gas control valve 24 regulates the amount of fuel flow entering the supply system and its various circuits, while fuel gas splitter valve 25 splits the fuel flow into the various circuits as desired by the engine operator. Off-gas supply conduit 22, which contains an off-gas, further comprises a means for compressing the off-gas 26, an off-gas pressure regulator 27, an off-gas main stop valve 28, an off-gas control valve 29, and a first mixed fuel stop valve 30. It is preferred that the means for compressing off-gas 26 comprises an auxiliary compressor and that off-gas supply conduit 22 further comprises an off-gas vent 36 to ventilate off-gas supply conduit 22 if necessary.

In the preferred embodiment of the present invention, fuel supply system 20 is providing fuel to a gas turbine combustor that utilizes a plurality of fuel nozzles, including a pilot nozzle, that are arranged in multiple circuits. In order to accomplish this fuel flow arrangement, at least one fuel gas control valve 24 comprises three gas control valves, 24a located in gas supply conduit 21 and additional control valves 24b and 24c to control the amount of fuel flowing to the main fuel nozzles and pilot fuel nozzle, respectively, for a combustor. Furthermore, at least one fuel gas splitter valve 25 comprises a first fuel gas splitter valve 25a and a second fuel gas splitter valve 25b. First fuel gas splitter valve 25a divides the fuel flow from gas supply conduit 21 into a primary circuit 32 and a secondary circuit 33. Second fuel gas splitter valve 25b is located within secondary circuit 33 such that it further divides the fuel flow within secondary circuit 33 into a secondary manifold 34 and a transfer manifold 35.

In order to lower the combustor emissions, an off-gas fuel is used where the off-gas is a fuel mixture preferably formed from at least hydrogen and methane at different concentration levels and is capable of combustion when mixed with air inside a combustion system. The exact concentrations of hydrogen and methane, as well as any other gases making up the off-gas, are dependent on the desired emissions reduction, off-gas availability, and individual operating requirements. Although it is preferred to use an off-gas comprising at least hydrogen and methane, one skilled in the art of gas turbine combustion will understand that the off-gas composition is not limited to the constituents listed, but could also comprise other gases including, but not limited to, propane, butane, and ethane. Utilizing an off-gas fuel such as a hydrogen-based gas is preferred because hydrogen gas is well known to have a higher flame speed and greater flammability limits, such that it provides greater flame stability at leaner conditions. Combining this fuel type with natural gas results in the blended fuel having these similar traits, such that it can be stably burned at a lower flame temperature to produce lower amounts of carbon monoxide, thereby leading to lower NOx levels for a given CO level.

In the preferred embodiment of the present invention, the off-gas is directed exclusively to the pilot fuel nozzle of the combustor. When the use of an off-gas is desired, first mixed fuel stop valve 30 is opened and the off-gas, which preferably comprises the constituents hydrogen and methane, is flowed through off-gas supply conduit 22, including means for compressing the off-gas 26, off-gas pressure regulator 27, and off-gas stop valve 28 such that off-gas control valve 29 is adjusted to a specified position to regulate the amount of off-gas directed towards secondary manifold 34. The fuel gas and off-gas are then blended in secondary manifold 34 to form a blended mixture, which then flows into a pilot fuel nozzle within a combustion system.

Figure 4:
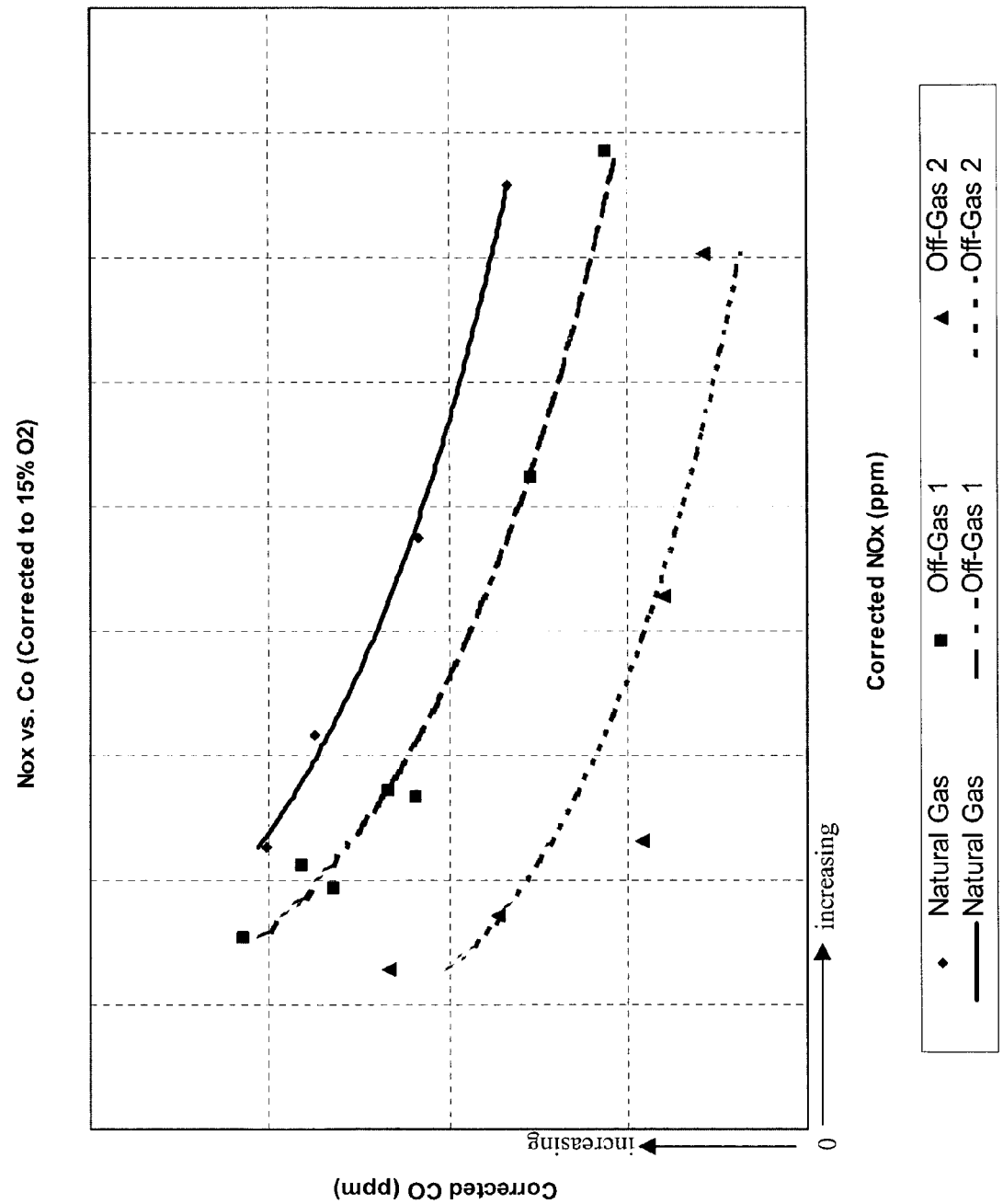
FIG. 4 is a chart showing NOx and CO emissions trends in accordance with an alternate embodiment of the present invention.
Figure 5:
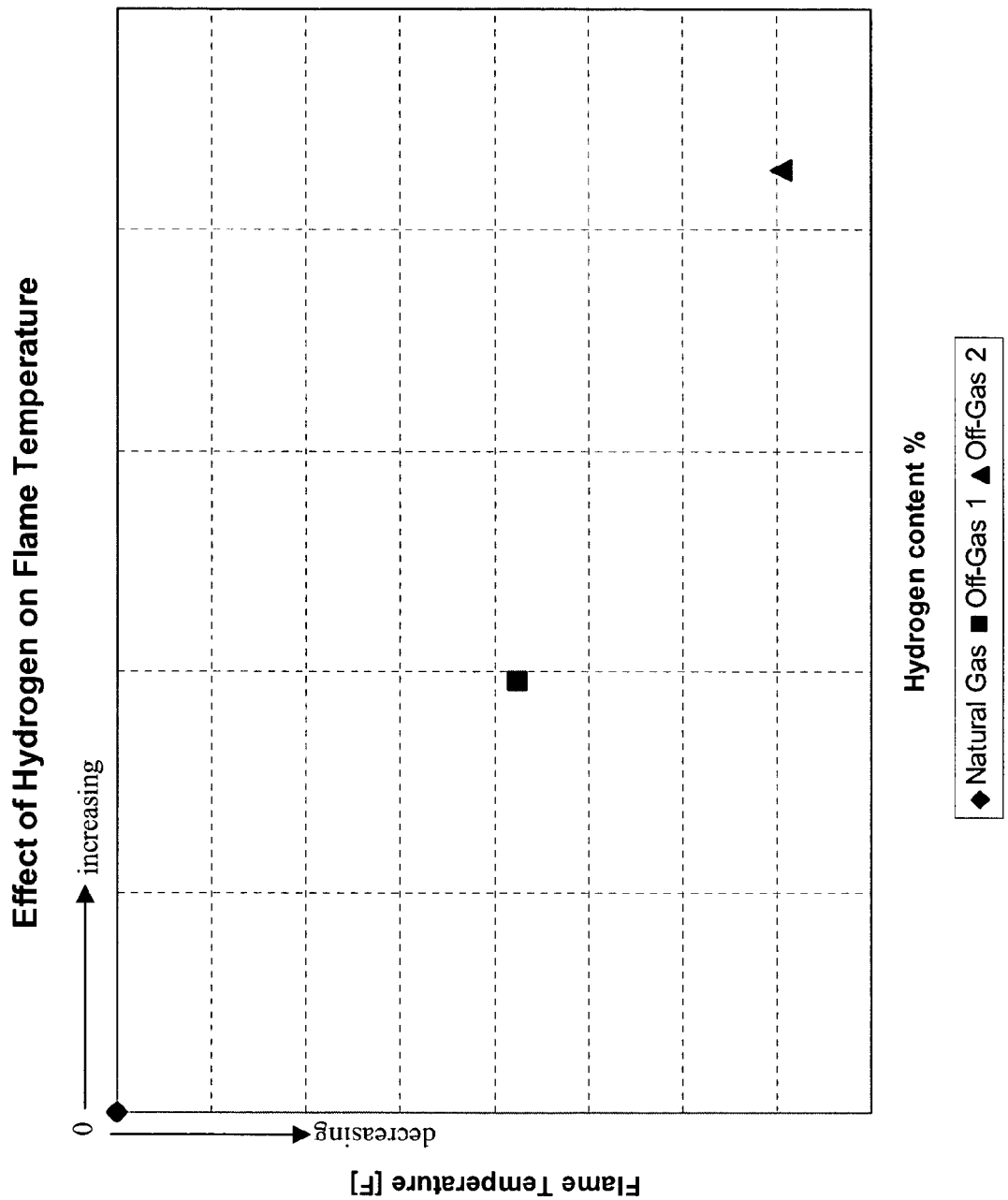
FIG. 5 is a chart showing flame temperature trends in accordance with an alternate embodiment of the present invention.

A series of tests were conducted on a pilot fuel nozzle in accordance with the alternate embodiment of the present invention. The pilot fuel nozzle is commonly used in a combustion system that contains a plurality of main fuel injectors arranged in an annular array about the pilot fuel nozzle. In the series of combustion tests, a baseline case was run exclusively with natural gas flowing through the pilot fuel nozzle, with NOx and CO emissions being recorded. Other tests were conducted in which the natural gas flowing to the pilot fuel nozzle was blended with various levels of an off-gas comprising at least the constituents hydrogen and methane. The general trends, with respect to NOx and CO emissions, as a result of this testing are shown in FIG. 4. When operating with the blended mixture of natural gas and off-gas 1, which comprises approximately 10% hydrogen and 64% methane, amongst other constituents, CO emissions are reduced, such that for a given level of CO, lower oxides of nitrogen are emitted. When this same pilot fuel nozzle is operated with a blend of natural gas and off-gas 2, which comprises approximately 21% hydrogen and 34% methane, a further reduction in CO emissions are seen. It has been determined from this testing that the hydrogen content of the off-gas that was blended with the natural gas had a positive effect on NOx reductions, but an even more substantial effect on CO reductions. As previously mentioned, utilizing an off-gas including hydrogen is desired because hydrogen gas is well known to have a higher flame speed and greater flammability limits, such that it provides greater flame stability at leaner conditions. Combining this fuel type with natural gas results in the blended fuel having these similar traits, such that it can be stably burned at a lower flame temperature to produce lower amounts of NOx and CO emissions. The tests results further confirmed that the blended mixture resulted in lower flame temperature, as shown in FIG. 5. For the blended mixture containing natural gas and off-gas 1, the effect of the off-gas resulted in a reduction in flame temperature and an even further reduction in flame temperature was recorded with off-gas 2.

While these specific tests focused only on blending an off-gas with natural gas for a pilot fuel nozzle in accordance with the preferred embodiment of the present invention, it is expected that similar reductions in CO and flame temperature will be achieved when an off-gas is blended with natural gas for all fuel nozzles within a combustion system. Depending on the operation mode of the combustor and the desired level of emissions reduction, the off-gas from off-gas supply conduit may be supplied to fuel gas supply conduit 21 such that a blend of fuel gas and off-gas passes through first fuel splitter valve 25a and into primary circuit 32 and secondary circuit 33, and as a result, into all fuel nozzles of the combustor.

Figure 3:
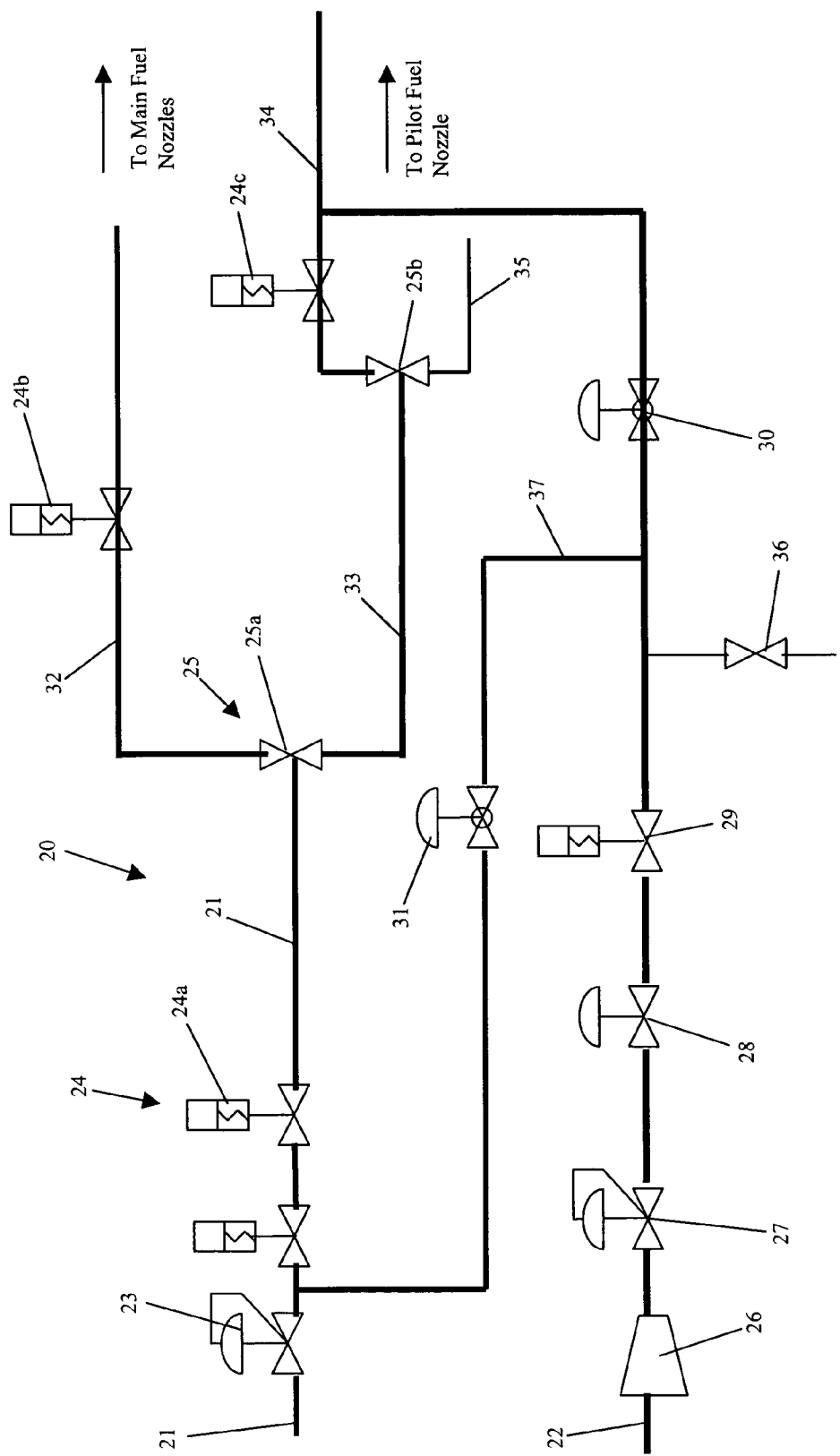
FIG. 3 is a process flow diagram for a fuel supply system in accordance with an alternate embodiment of the present invention.

This alternate embodiment of the present invention is shown in FIG. 3. The alternate embodiment of the present invention is similar to the preferred embodiment in that it supplies an off-gas to a combustor for the means of lowering pollutant emissions. However, in this alternate embodiment, the off-gas is directed towards a fuel gas supply conduit that supplies fuel to all fuel nozzles in the combustor. Fuel gas supply conduit 21 is provided, as previously described, with a main gas pressure regulator 23, at least one fuel gas control valve 24, and at least one fuel gas splitter valve 25. The alternate embodiment of the present invention also utilizes three fuel gas control valves 24a, 24b, and 24c, as previously described, while at least one fuel gas splitter valve comprises a first fuel gas splitter valve 25a and a second fuel gas splitter valve 25b. Also provided, as previously described, is an off-gas supply conduit 22 comprising a means for compressing an off-gas 26, an off-gas pressure regulator 27, an off-gas main stop valve 28, an off-gas control valve 29, and a first mixed fuel stop valve 30. Passage 37, which includes second mixed fuel stop valve 31, is provided to interconnect fuel gas supply conduit 21 and off-gas supply conduit 22.

The method under which this off-gas to fuel gas blending occurs and is provided to a plurality of fuel nozzles within a combustor is best described in the following steps. A combustion system is provided having a plurality of main fuel nozzles and a pilot fuel nozzle. A fuel gas, such as natural gas, is flowed through main gas pressure regulator where its supply pressure is lowered as necessary to comply with the combustion requirements of the engine. If the use of the off-gas is desired, and if not already in the closed position, first mixed fuel stop valve 30 is closed such that the flow of off-gas is directed into passage 37. Next, an off-gas, which preferably comprises the constituents hydrogen and methane, is flowed through off-gas supply conduit 22, including means for compressing the off-gas 26, which is typically an auxiliary compressor, off-gas pressure regulator 27, and off-gas stop valve 28 such that off-gas control valve 29 is adjusted to a specified position to regulate the amount of off-gas flowing into passage 37. The amount of off-gas to blend with the fuel gas depends on the chemical composition of the off-gas, but is usually up to approximately 20% of the total fuel flow to the combustion system. Second mixed fuel stop valve 31 is then opened in passage 37 to allow the off-gas to flow through passage 37 and towards fuel gas supply conduit 21. It is desired for this embodiment, that the off-gas enter the fuel gas supply conduit upstream of the first fuel gas control valve 24a, so that the overall flow of fuel to the combustor can be regulated by control valve 24a and blending may occur before being split to the various circuits of the combustor. Specifically, when a blended mixture is flowing from first fuel gas control valve 24a, first fuel gas splitter valve 25a splits the blended mixture between primary circuit 32 and secondary circuit 33, depending on the flow requirements of each circuit. However, for the combustion system in fluid communication with the fuel supply system of FIG. 2, it is most common that for baseload operating conditions, approximately 80% of the total fuel flow is directed into primary circuit 32 by first fuel gas splitter valve 25a. The remainder of the blended mixture, having been directed to secondary circuit 33 is then further split by a second fuel gas splitter valve 25b that is located in secondary circuit 33. This fuel split operation is dependent on the mode of operation of the combustor and fuel nozzle configuration.

While the invention has been described in what is known as presently the preferred embodiment, it is to be understood that the invention is not to be limited to the disclosed embodiment but, on the contrary, is intended to cover various modifications and equivalent arrangements within the scope of the following claims.

What we claim is

1. A fuel system for introducing an off-gas fuel to a combustion system, said fuel supply system comprising:
    a fuel gas supply conduit gas comprising a main gas pressure regulator, at least one fuel gas control valve, a first fuel gas splitter valve capable of splitting a fuel gas between main nozzles in a primary circuit and a secondary circuit, and a second gas splitter valve in said secondary circuit capable of splitting said fuel gas between a secondary manifold and a transfer manifold; and,
    an off-gas supply conduit comprising a means for compressing an off-gas fuel supplied to the combustion system, an off-gas pressure regulator, an off gas main stop valve, and an off gas control valve;
    wherein said off gas supply conduit is in selective fluid communication with at least said secondary manifold for supplying the off-gas fuel to at least a pilot nozzle.

2. The fuel system of claim 1, wherein said at least one fuel gas control valve comprises three gas control valves.

3. The fuel supply system of claim 1 wherein said off-gas supply conduit is in fluid communication with said fuel gas supply conduit such that a blend of said fuel gas and said off gas passes through said first fuel gas splitter valve and into said primary circuit and said secondary circuit.

4. The fuel supply system of claim 1 wherein said off-gas supply conduit is in fluid communication with said secondary manifold and mixes with said fuel gas in said secondary manifold to form a blended gas mixture.

5. The fuel supply system of claim 4 wherein at least a pilot fuel nozzle is in fluid communication with said secondary manifold to receive said blended gas mixture.

6. The fuel supply system of claim 1 wherein said off-gas supply conduit further comprises an off gas vent in said off-gas supply.

7. The fuel supply system of claim 1 wherein said means for compressing said off-gas comprises an auxiliary axial compressor.

8. The fuel supply system of claim 1 wherein said fuel gas is preferably natural gas.

9. The fuel supply system of claim 1 wherein said off-gas supply conduit contains an off-gas comprising at least the constituents hydrogen and methane.

10. The fuel supply system of claim 1, wherein said off gas supply conduit is also in selective fluid communication with a plurality of main fuel nozzles through a mixed fuel stop valve.

11. A fuel system for introducing an off-gas fuel having at least hydrogen and methane to a combustion system, said fuel supply system comprising:
    a fuel gas supply conduit containing a fuel gas and having a main gas pressure regulator, at least one fuel gas control valve, a first fuel gas splitter valve and a second fuel gas splitter valve, the first fuel gas splitter valve splitting said fuel gas between a primary circuit and a secondary circuit, said second fuel gas splitter valve being located in said secondary circuit so as to split said fuel gas in said secondary circuit between a secondary manifold and a transfer manifold; and an off-gas supply conduit containing said off gas and comprising a means for compressing said off-gas, an off-gas pressure regulator, an off-gas main stop valve, an off-gas control valve, and a first mixed fuel stop valve;

wherein said off gas supply conduit is in fluid communication with said fuel gas supply conduit with said fluid communication controlled through a second mixed fuel stop valve.

12. The fuel supply system of claim 11, wherein said off-gas supply conduit is in fluid communication with said fuel gas supply conduit such that a blend of said fuel gas and said off-gas passes through said first fuel gas splitter valve and into said primary circuit and said secondary circuit.

13. The fuel supply system of claim 11, wherein said off-gas supply conduit is in fluid communication with said secondary manifold and mixes with said fuel gas in said secondary manifold to form a blended gas mixture.

14. The fuel supply system of claim 13, wherein at least one fuel nozzle is in fluid communication with said secondary manifold to receive said blended gas mixture and inject said blended gas mixture into said combustion system.

* * * * *

UNITED STATES PATENT AND TRADEMARK OFFICE
CERTIFICATE OF CORRECTION

PATENT NO. : 7,624,564 B2  Page 1 of 1
APPLICATION NO. : 10/897785
DATED : December 1, 2009
INVENTOR(S) : Stuttaford et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1530 days.

Signed and Sealed this

Twenty-sixth Day of October, 2010

David J. Kappos
*Director of the United States Patent and Trademark Office*